United States Patent [19]
Zahariev et al.

[11] Patent Number: 5,872,921
[45] Date of Patent: Feb. 16, 1999

[54] SYSTEM AND METHOD FOR A REAL TIME DATA STREAM ANALYZER AND ALERT SYSTEM

[75] Inventors: Manuel Zahariev, Burnaby; Nicholas R. Miller, West Vancouver, both of Canada

[73] Assignee: DataLink Systems Corp., San Jose, Calif.

[21] Appl. No.: 687,161
[22] Filed: Jul. 24, 1996
[51] Int. Cl.[6] .................................................. G06F 13/00
[52] U.S. Cl. ..................................... 395/200.33; 395/201
[58] Field of Search ......................... 395/200.33, 200.47, 395/201, 210, 235–237, 800.01; 340/825.26, 825.5, 825.3; 705/37

[56] References Cited

U.S. PATENT DOCUMENTS

| | | | |
|---|---|---|---|
| 5,003,473 | 3/1991 | Richards .................................... | 705/37 |
| 5,270,922 | 12/1993 | Higgins ..................................... | 705/37 |
| 5,530,438 | 6/1996 | Bickhman et al. .................. | 340/825.34 |
| 5,661,781 | 8/1997 | DeJager ..................................... | 379/67 |
| 5,708,422 | 1/1998 | Blonder et al. ..................... | 340/825.34 |

*Primary Examiner*—Alpesh M. Shah
*Attorney, Agent, or Firm*—Donald R. Boys

[57] ABSTRACT

A computerized analyzer for a transactional data stream prepares feed records from the data stream, the feed records comprising all transaction records received in a finite time slice. A new feed record is prepared for each passing time slice, and, in a preferred embodiment, new time slices are generated during operation based on record volume received during a previous time slice. The feed records are condensed to significant feed records by selecting only those transaction records in each feed record that are significant according to prestored criteria including subscriber interest records. Once a significant feed record is prepared, it is compared with subscriber interest records to produce an alert table. An alert transmitter transmits alerts to subscribers following the alert table. Alerts are deleted from the alert table as they are sent to subscribers. The system is suited to many types of transactional data streams, and suited for such as stock quote data streams.

5 Claims, 2 Drawing Sheets

```
100
101        Bold = objects
102        Italic = actions (methods, code members)
103
104        Core
105
106        DataLink is the provider of the TradeAlert service.
107        Incoming high speed data Feeds are processed by DataLink.
108        A Feed is empty when no data has been received since the last lookup made on the Feed. An
           incoming Feed is structured in Feed Records. Feed Records are Read from the Feed. Feed
           Records refer to a finite number of unique Feed Issues.
109        A Feed Table is a buffer for all Feed Records received in a finite time slice. Feed Records are
           Written to a Feed Table.
110        A Significant Feed Table is a buffer containing all Feed Records in a Feed Table that are
           unique for Feed Issues and for Interest Criteria.
111        Interest Criteria apply to records - called Customer Interest Records - in Customer Interest
           Tables.
112        Customer Interest Records show Interest Criteria that Customers have with regards to Feed
           Records in incoming data Feeds.
113        An Alert is an atom of information provided by TradeAlert to Customers.
114        Alerts are generated in an Alert Table by matching records in the current Significant Feed
           Table with records in a Customer Interest Table.
115        Alerts are records in the Alert Table.
116        Alerts are send to Customers and then deleted from the Alert Table..
117
118        Procedures
119
120        Concurrent tasks in service TradeAlert are
121               {
122                      Receive Feed Records
123               Query
124                      Send Alerts
125               }
126
127
128        task Receive Feed Records is
129               forever
130                      if not Feed :: isEmpty() then
131        <F1>                Feed :: Read( FeedRecord )
132        <F2>                FeedTable :: WriteRecord( FeedRecord )
133
134        task Query is
135               forever
136        <Q1>          FeedTable :: SelectSignificantRecords ( SignificantTable )
137        <Q2>          SignificantTable :: GenerateAlerts( CustomerInterestTable, AlertTable )
138
139        task Send Alerts is
140               forever
141                      if not AlertTable :: isEmpty() then
142                              AlertTable :: currentRecord :: SendAlert()
143                              AlertTable :: currentRecord :: delete
```

*Fig. 1*

SYSTEM AND METHOD FOR A REAL TIME DATA STREAM ANALYZER AND ALERT SYSTEM

CROSS REFERENCE TO RELATED APPLICATIONS

The present application is related to the application titled "Mail Alert System" filed Jun. 29, 1996 by the same inventor, bearing the Ser. No. 08/673,350.

FIELD OF THE INVENTION

The invention is in the field of processing systems for real-time data streams of transaction records, and pertains in particular to a system for processing such data streams according to specific criteria, and reporting results of such processing.

BACKGROUND OF THE INVENTION

Scholars and historians have traditionally given names to different periods based on dominant characteristics of the time. The time we live in is often called the information age. Development of more and more sophisticated communication systems together with larger and more complex institutions has made it so. Businesses of all sorts and private individuals too, rely heavily on timely information to make decisions on an ongoing basis. Timely information is truly a most important commodity.

Much, if not most information is incremental rather than continuous, and systems for assimilating, analyzing, and reporting such information must allow for this characteristic. Such information occurs and is reported in small bites. Transaction information and transaction analysis is a good example, and of this sort of information, stock sales reports are typical, and will be used as an example in the present patent application.

In the case of stock reports, such as the transactions of the New York Stock Exchange, good and timely information can easily make a difference between success and failure in stock trading. The same is true in transaction analysis in many other areas of human endeavor. In stock trading as an example, individuals making private decisions and people making decisions for large organizations, have to have certain information for their decisions, and success may well depend on quickly noting specific events or trends in transactions. If an event or trend is missed altogether or only noticed with serious delay, the result can be catastrophic.

It is quite common today among companies and individuals as well to use computer technology to track and analyze such information, and many systems for doing this sort of analysis has been developed. Some, in the case of individuals, are designed to operate on personal computers, such as laptop and desktop PCs. In the case of bigger organizations systems may operate on large and more powerful computers. Regardless of the ability of the computer equipment, however, there are still drawbacks, based primarily on the fact that the data stream in many cases is simply enormous. In the case of stock transactions for example, people make decisions based on such as instant prices, price trends, volume of sales, volume trends, high and low sales in a fixed period, and the like. Different analysts, of course, use differing criteria. To appreciate the scope of the problem, one need only check the volume of transactions for a single trading day on the New York Stock Exchange. On Jul. 16, 1996, for example, the sales volume on the New York Stock Exchange was 422,903,290 shares in the 8-hour trading day. This is more than 14,684 shares traded per second. Shares, of course, are not traded one-share-at-a-time, but typically in blocks of 100 shares. So the number of transactions (blocks) in this particular case is over 100 transactions per second. To make meaningful analysis on the basis of such a massive transaction data stream is a prodigious process.

What is clearly needed is an analysis system that can quickly and efficiently track and analyze such a massive data stream, using equipment of a reasonable size, power, and cost, and provide summary information analyzed according to diverse sets of criteria to subscribers.

SUMMARY OF THE INVENTION

In a preferred embodiment of the present invention a method for analyzing a data stream of transaction records is provided, comprising steps of: (a) prestoring criteria for significance; (b) applying time slices to the data stream to create successive finite feed records consisting of those transaction records occurring in each time slice; (c) comparing the records in each finite feed record with the criteria for significance, (d) preparing therefrom significant records of just those transaction records matching the criteria for significance; and (e) providing the successive significant records for further procedure. In some embodiments each feed record analyzed and each significant record produced is discarded after use.

In a preferred embodiment a new time slice is generated for each data cycle based on the volume of records received during a prior time slice.

In some embodiments the further procedure comprises comparing each significant feed record produced with pre-stored customer interest tables, and producing therefrom an alert table. The alert table is used to guide transmission of alerts to subscribers, and alerts are deleted from the alert table after transmission to a subscriber. The system is adaptable to all sorts of transactional data streams, and is very useful for such as stock quote data streams.

The system in various embodiments provides a way to analyze a transactional data stream and to produce processed information for alerting users and guiding users in decisions based on the data contained in a data stream. The system has an advantage in speed of analysis, operating in near real time, and requires smaller, less powerful, and hence less expensive computer equipment for analysis than is typically required for analysis on a comparative scale by conventional techniques using conventional equipment platforms.

BRIEF DESCRIPTION OF THE DRAWING FIGURES

FIG. 1 is a pseudo code listing of operating code for a TradeAlert™ transaction analysis system according to a preferred embodiment of the present invention.

DESCRIPTION OF THE PREFERRED EMBODIMENTS

Figure 2:
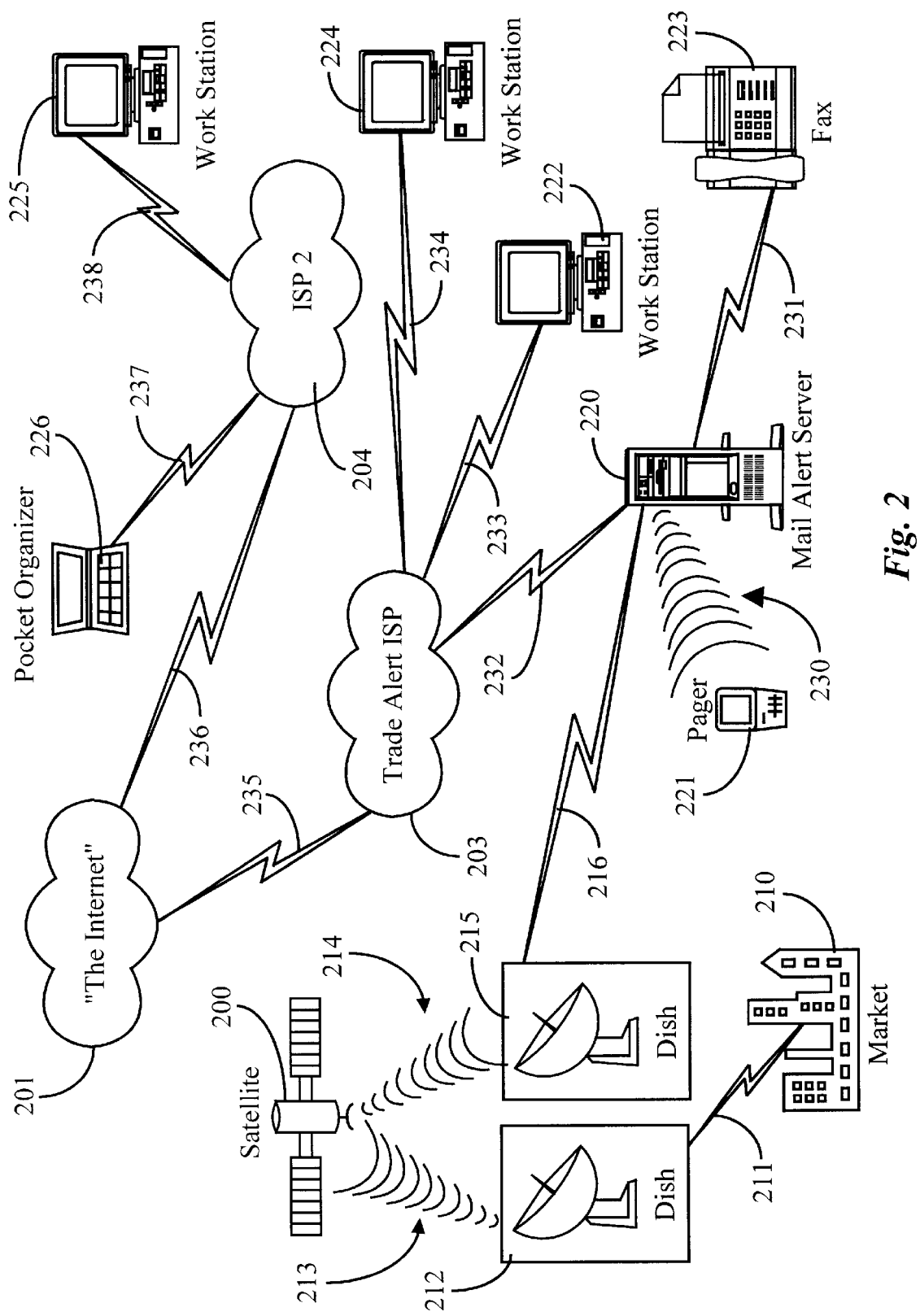
FIG. 2 is a diagrammatical illustration depicting a typical topology in the embodiment of FIG. 1.

The present invention is a new method and apparatus comprising a data-processing system that provides for processing of massive amounts of data in finite time slices, providing as a result processed information in substantially realtime without necessity for extremely powerful and thus expensive computing hardware. By realtime results is meant that processed information is presented to a user of the system from a massive transactional data stream very nearly as the data stream is received, with a delay too small to be noticable by a user. Data thus processed may be directly read and used by a user, and then, if appropriate, be input to other systems for further processing.

In the present invention near realtime results are achieved by a unique process fully described below, wherein information batches over finite time slices are taken from a transactional data stream, processed according to pre-stored criteria, then presented as results to a user or users, which in many embodiments may be paying subscriber's to a processing system. In this specification the inventor has termed the system in a general sense a Real Time Transaction Alert System, used as a descriptive title for this specification. In a particular embodiment the system is named the TradeAlert™

FIG. 1 is a pseudo code listing of operating code for the TradeAlert™ transaction analysis system according to a preferred embodiment of the present invention, and FIG. 2 is a diagrammatical illustration depicting a typical topology in the embodiment of FIG. 1. These two figures are referred to extensively below in describing exemplary embodiments of the present invention.

Refer first to FIG. 2, which shows an exemplary topology wherein the data stream to be analyzed is from a stock trading organization such as the New York Stock Exchange. Data is generated at the Market 210, then sent via data link 211 to ground station 212. The data stream then continues via uplink 213, satellite 200 and downlink 214 to receiver dish 215, which then feeds into TradeAlert™ server 220 via data link 216. In TradeAlert server 220 the signal on link 216 carrying the relevant data stream, in this case transactions of the stock exchange, is demodulated (with internal satellite modem e.g.) and the data is fed into a feed 130 (see FIG. 1) of the processing system described herein. After processing described in detail below with primary reference to FIG. 1. The results can be distributed in one or more of several ways, as shown for example by pager 221, via Fax 223, or via Internet or other similar local area network and/or wide area network in any combination to workstations, such as stations 222, 224 and 225 or wireless organizers such as organizer 226.

It will be apparent to those with skill in the art that any of the elements shown and the organization of the elements may vary in a number of ways, and also that plural elements may in some instances be used without departing from the spirit and scope of the invention. For example, in a system with multiple subscribers, which will be typical, there will be multiple result feeds, at least one to each subscriber. There are many elemental substitutions that may be made as well. For example, the satellite link may be a leased phone line and/or Internet or other type of network connection. The same comments apply to the notification side any type of electronic messaging may be used, in addition or instead of those shown to transmit the alert notices and any other result data, such as synthesized phone calls on multiple phones, Teletext notification in areas with Teletext service, digital phone messaging where available, and so forth.

Referring now primarily to FIG. 1, lines 100–116 provide descriptive definitions, which are used below in description of the system. In this listing of definitions, Objects are listed in bold type, objects being those elements of the invention upon which actions are performed or which are the result of actions performed. Objects may in many cases be abstract in character. Actions performed by the TradeAlert™ system are listed in Italics. Much of the definition portion of the pseudo-code of FIG. 1 is reproduced below with further aliteration.

Line 107 indicates that incoming high-speed Feeds are processed by the TradeAlert™ system. There may be, depending on the size and sophistication of the equipment and the control routines in various embodiments of the invention, multiple data Feeds, and the Feeds may provide transactional records of one or more of many different types. For purposes of illustration herein a Feed is a stock transaction data stream.

Line 108 indicates that a Feed is considered to be empty when there has been no data received since a previous lookup, and that an incoming Feed is structured in Feed Records. Feed Records are read from a Feed data stream. A Feed Record then, is a finite record which may contain multiple Feed Issues. In the example of stock transactions, Feed Issues are individual stock transaction records, and a Feed Record is an atom of information in a Feed indicating a group of transactions. As indicated above in the Background section, in the case of the New York Stock Exchange, these records could come at a rate of greater than 100 Feed Records per second. In other cases the data feed rate could be greater or lesser.

Line 109 defines a Feed Table as a buffer for handling feed records received in a finite time slice. The TradeAlert™ system looks at a Feed and creates Feed Tables at specific intervals, referred to herein also as time slices. The time slice is a variable in a preferred embodiment, and is calculated by the system The value of the time slice determines, based on assumptions about the rate of a Feed, about how many Feed Records will be in a Feed Table.

Line 110 defines a Significant Feed Table as a buffer containing all Feed Records in a Feed Table that are unique for Feed Issues and for Interest Criteria. Interest Criteria are indications of customer interest in Interest Records in Customer Interest Tables (Line 111). In the system, interests of customers are pre-recorded as Interest Records in Customer Interest Tables, which are used in processing data by the system.

Line 113 defines an Alert as an atom of information provided to a customer. Alerts are generated in an Alert Table by matching records in a current Significant Feed Table with records in a Customer Interest Table. Once Alerts are sent to a customer (user) they are deleted from the Alert Table.

As noted in line 120, tasks are concurrent and ongoing. That is, once a Feed Table is created, the system does not wait for all other processes relevant to that Feed Table to be carried out before another is created.

Procedures of the TradeAlert™ system are described in FIG. 1 after line 120. There are, in the embodiment described, three concurrent procedures. These have been labeled in FIG. 1 as (a) Receive Feed Records (b) Query and (c) Send Alerts.

In the following descriptions of the tasks and characteristics of the tasks, these definitions are used:

T=duration of a time slice

N=number of customer records in the system, which is the number of customers served m=data feed rate in records per unit of time M=number of feed records received in a time slice T, which is a function of T & m S=size of the Significant Table I=number of unique issues in the feed Coeff1=Coefficient Receive Feed Records is the process of operating on the incoming Feed and producing Feed Tables. Each Feed Table is a result of grouping Feed Records received over a finite time slice T. The task is a continuing task (forever), and each Feed Table produced has a size M depending on the variable m. There may be assumed an upper limit for m, as the physical parameters of the system (bandwidth, nature of links) will support only a certain maximum rate.

In a preferred embodiment, the time slice is determined for each processing cycle dependent on the data feed. For example, given a value for a first finite time slice t1, a finite number of records will be captured from the data stream and processed. The value for the next time slice t2 is determined from the first time slice t1, as t2=f(t1), where f is preferably a continuous function increasing in t. The idea here is, as the data feed varies in volume, the time slice also varies, with a longer time slice for heavier feed.

Task Query operates on Feed Tables produced by task Receive Feed Records to produce Significant Feed Tables and Alert Tables. In Query successive Feed Tables are scanned for significant data only; the significant data being that data matching Feed Issues and Interest criteria in Customer Interest Records.

It is in task Query that a significant advantage over conventional data stream processing lies. Many fewer records, namely the significant records only, have to be matched against each and every customer profile, and thus processing time is greatly reduced. For an example, in a time slice of t1, data for ten-thousand records (10 kT) may be received. Assume for this example that all of the customers are interested only in IBM stock. The Feed Record produced from this time slice, having a total of 10 kT, may include only 500 records for the stock IBM (chosen as example of an active issue). Out of these 500 records, customer criteria may indicate only the highest, lowest, least margin and most margin may need be selected, as well as the total volume. So the 500 records would be concentrated into perhaps 5 records, which greatly simplifies the matching for customer requests. The Query task in this case produces a Significant Feed Table of 5 records out of ten thousand in the Feed Table.

Producing the Significant Feed Table in task Query is a first step. In a second step, individual customer interests are consulted from Customer Interest Records and an Alert Table is produced for use by task Send Alerts.

Task Alerts is the procedure of processing the Alert Tables produced in Step 2 of Task Query, and forwarding the actual alert signals to customers, which are then deleted from the Alert Table. The methods and mechanics of sending alerts has been discussed above.

In various embodiments of the present invention, existing elements of control routines and the like may be incorporated as elements of the invention. There are, for example, existing database programs that may be incorporated for performing some of the operations in the various tasks. It will be apparent to those with skill in the art that for a Sendalert™ system to operate successfully, it must be capable of processing a given incoming data stream without undue delay (to operate in substantially real time), as advertised. For this to be so, certain criteria have to be met. Part of the requirement may be met by knowledge of the nature of an incoming data stream and of the tools used to create it. For example, for most data feeds artificially generated, it can be assumed that operations on a database originate the data feed. This will dictate a choice of a database at the SendAlert™ system can be made so that the speed of the incoming feed will be supported.

Here some further considerations:

F1, F2, Q1 & Q2 in angle brackets < > (lines 131, 132, 136 and 137) in FIG. 1 are variables describing the average estimated times for the appropriate steps to complete <F1> is dependent on the parameters of the incoming feed (speed, distribution, etc.).

<F2> is dependent on the speed of the database and of the hardware available.

<Q1> is dependent on the size of FeedTable at the time of execution—M

It can be assumed:

$$<Q1> \sim Coeff1*M, \text{ with } Coeff1<1$$

(selection is cheaper than insertion in most databases)

It can be assumed that the size of the SignificantTable is limited up by the number of unique issues supported by the feed (same order of magnitude).

S~I (see example of IBM above)

<Q2> is dependent on the size of the Customer Interest Table (~N)

<Q2>~N*I

A value for the time slice can be dictated by the Query task as being:

$$T=<Q1>+<Q2>=(Coeff1*M+I*N)*\beta$$

It can be assumed that M is a linear function of T (because of speed limit on feed), so:

$$T=\beta*(m*T+I*N)$$

This equation in T has one unique finite solution.

Based on the above, it can be stated that a system using the above algorithm will be able to provide the service with a delay of a finite time slice T.

For any instance of the system, the time slice T can be reduced by hardware and software (database) upgrades.

Consideration in differential equations will show that in conditions of a variable feed with a finite speed, such a system would oscillate with a finite decreasing amplitude and would never get into an unstable state.

It will be apparent to those with skill in the art that there are many alternatives to the embodiments described above that might be incorporated without departing from the spirit and scope of the invention. Many of these alternatives have already been mentioned. It is common, for example, for different programmers to utilize widely varied code sequences to accomplish the same results. There are similarly many alternatives in the computer and communication hardware described that might be incorporated without departing from the spirit and scope of the invention. Length of time slice can vary from one embodiment to another. Adaptivity to specific data feeds may be accomplished as well by altering the code routines used to practice the invention. There are many other alternatives that may be used, so the invention is limited only by the scope of the following claims.

What is claimed is:

1. A computerized method for analyzing a data stream of transaction records, comprising steps of:

(a) prestoring criteria for significance specific for different users in interest tables unique to the different users;

(b) applying finite time slices to the data stream to create successive finite feed records consisting of those transaction records occurring in the time slices;

(c) comparing the records in each finite feed record with the criteria for significance, and preparing therefrom significant records of just those transaction records matching the criteria for significance;

(d) updating an alert table from the significant records according to items of interest in the interest tables unique to the different users; and (e) issuing alerts to the different users according to the alert table; and wherein each successive time slice is determined as a function of the quantity of data received during application of a previous time slice.

2. The method of claim 1 wherein the time period between issuing of alerts to the different users is equal to the time period of the time slice.

3. The method of claim 1 wherein the data stream of transaction records is a continuing feed of stock transactions, and the criteria for significance includes customers interest in one or more of specific companies, specific prices, and sales volume per time unit.

4. A computerized system for analyzing a data stream and alerting subscribers, comprising:

a receiver adapted for preparing successive feed records, each feed record comprising all transaction records in a data stream received in a finite time slice;

a selection processor adapted for selecting those transaction records in each feed record matching prestored significance criteria, and preparing therefrom a significant feed record from each feed record;

an alert generator adapted for creating an alert table of alerts to be transmitted, the alerts created by comparing transaction records in the significant feed record with prestored subscriber interest tables; and an alert transmitter for transmitting alerts to subscribers following alerts stored in the alert table, and for deleting alerts sent to subscribers from the alert table; and wherein the computerized system further comprising a time slice generator adapted for determining a new time slice based on quantity of records collected during a prior time slice.

5. A computerized system for analyzing a data stream as in claim 4 wherein the system is adapted to analyze stock transaction records received in a data stream.

* * * * *